United States Patent [19]

Bern

[11] Patent Number: 5,138,549

[45] Date of Patent: Aug. 11, 1992

[54] AUTOMATED TAX DEPOSIT PROCESSING SYSTEM

[75] Inventor: David A. Bern, Reseda, Calif.

[73] Assignee: Dabco Computer Services, Inc., Cape Coral, Fla.

[21] Appl. No.: 344,625

[22] Filed: Apr. 28, 1989

[51] Int. Cl.$^5$ .............................................. G06F 15/21
[52] U.S. Cl. .................... 364/408; 364/401; 364/406
[58] Field of Search ...................... 364/401, 406, 408; 379/90; 902/24

[56] References Cited

U.S. PATENT DOCUMENTS

| | | | |
|---|---|---|---|
| 4,554,418 | 11/1985 | Toy | 364/900 X |
| 4,766,542 | 8/1988 | Pilarczyk | 364/401 X |
| 4,890,228 | 12/1989 | Longfield | 364/408 |
| 4,970,655 | 11/1990 | Winn et al. | 364/479 |

OTHER PUBLICATIONS

*American Banker*, Oct. 30, 1987, "Sovran introduces tax filing service", p. 19 (abstract only).
*Houston Post*, Jan. 24, 1988, "Collections of Payroll Taxes May Soon be by Computer", Business p. 6D.
*Washington Post*, Dec. 18, 1988, "New Technology Lets Your Fingers Do the Banking", p. H2-3 (abstract only).
*Bank Systems & Technology*, May 1990, "Bank Clients Get Fed Tax Automation", p. 18 (abstract only).
*Corporate EFT Report*, Jan. 30, 1991, "STS Offers Service to Automate TT & L System", pp. 6-7 (abstract only).

Primary Examiner—Dale M. Shaw
Assistant Examiner—David Huntley
Attorney, Agent, or Firm—Gregory B. Wood

[57] ABSTRACT

A system for the automatic processing of payroll, corporate profit and excise taxes. A depositor, via a communication link, engages in a question and answer exchange with one of a multiple number of voice synthesizers connected to a processor. Through the exchange, the depositor enters tax deposit information which the processor stores in its memory. At the end a specified time period, the processor stores tax deposit information relating to tax deposits due the same day on a storage medium such as a magnetic tape, and on tax coupons in formats predefined by the government agency. The processor also stores tax deposit information entered during the specified time period on a second storage medium to enable a bank to automatically transfer tax deposits from each depositor's account to a bank account. The system includes remote communication terminals connected by communication links to the processor through which information on depositors and tax deposit due dates is entered. The processor stores this information in a storage medium such as the processor's hard disk. In addition, the system includes hard copy printers through which the processor creates multiple records of each tax deposit.

16 Claims, 8 Drawing Sheets

AUTOMATED TAX DEPOSIT PROCESSING SYSTEM

BACKGROUND OF THE INVENTION

The present invention relates to methods for depositing and processing taxes. More particularly, it pertains to systems and methods for automatically recording employment, corporate profit and excise tax deposits. The invention includes methods for automatic recording of tax deposit information on a storage medium for use in making bank deposits and withdrawals, as well as automatic recording of tax deposit information on a storage medium and tax deposit coupons to be given to a government agency.

The Department of the Treasury through the Internal Revenue Service and most state governments require taxpayers to periodically deposit withheld employment, corporate profit, and excise taxes in an authorized financial institution or a Federal Reserve Bank branch. Each government contracts with banks to collect the withheld employment, corporate profit and excise taxes. The contract allows a bank to collect tax deposits and tax coupons from depositors. The bank, upon receipt of a tax coupon, must deposit the tax deposit into a Treasury Tax and Loan Account, a TT&L account. The next day, by law, the bank must transfer the money in the TT&L account to the government agency. Thus, the bank earns a one day float on all deposits made with the bank plus a thirty cent charge per deposit.

The traditional method of depositing such taxes with a bank requires a depositor to calculate the due date for the tax deposit according to a government schedule. No later than the day the tax is due, the depositor must manually fill out a tax deposit coupon and write a check for the amount of the tax deposit. The depositor then physically travels to the bank, waits in line for an available bank teller and deposits the tax check and tax deposit coupon with the bank as he does any other manual deposit. The depositor may also mail the tax check and tax deposit coupon to the bank.

The bank teller, or other bank personnel, must stamp the tax deposit coupon in a specified location, indicating the date the tax deposit was made. The government assesses financial penalties against a bank for any procedural or substantive error made by a teller in stamping the tax coupon; thus, banks often hire personnel whose sole duties are to verify that tax deposit coupons have been stamped correctly.

By law, a bank must also prepare voluminous reports and forms within a specified time period after a tax deposit is received. Any error in these reports and forms will also result in the assessment of significant financial penalties against the bank.

After receiving the deposit papers from the depositor, the bank withdraws the tax deposit from the depositor's account and deposits the money into the Treasury Tax & Loan Account. By law, the bank's receipt of a tax deposit coupon triggers the bank's duty to transfer the tax deposit to the government. If the depositor makes a tax deposit several days early, the bank is still required to transfer the money it receives from the taxpayer to the government agency by the next day. By 12:00 the next day, after receipt of a tax coupon, the bank must prepare an "advice of credit" and electronically transfer the money to the government agency. Thus, the bank earns a one day float on each tax deposit.

Under the traditional system, the bank's transaction costs are approximately four dollars per transaction. This includes the personnel time involved in accepting tax deposits, in checking tax coupons to verify they have been properly stamped, and in filling out reports. Increased lobby traffic and financial penalties also add to the bank's costs. The bank's transaction costs are greater than the money the bank earns from the one day float and the thirty cents per deposit paid to the bank. Thus, the bank usually loses money under the current system and the bank is burdened with a labor intensive system which is expensive to operate. Additionally, it is almost impossible to eliminate all bank related errors, thus the bank's transaction costs include the penalties assessed by the government agency.

The present invention addresses the shortcomings of the present-day traditional bank deposit method by providing an improved system and method wherein a depositor may eliminate almost all manual steps necessary in making a tax deposit thereby increasing convenience to the taxpayer. The present invention also allows a depositor to enter future payroll dates. At the depositor's option, the present invention prompts the depositor to make the deposit shortly before it is due. The present invention also tracks the depositor's depositing patterns. When the depositor makes a deposit, the present invention calculates the number of days between the current date and the tax deposit due date. If a depositor consistently deposits a tax deposit less than two banking days before it is due, and then makes a tax deposit two or more banking days before it is due, the present invention alerts the depositor to the pattern variation. The depositor may then validate the tax deposit or re-enter the payroll date and amount.

The system also drastically reduces the labor intensive work performed by bank personnel in accepting tax deposits and generating reports. Further, the system minimizes the chance of bank errors while significantly increasing the "float" time the bank earns on a deposit.

Hence, the present invention decreases lobby traffic in the bank and personnel time involved in accepting and processing tax deposits. The automatic processing of tax deposits, as well as the automatic generation of reports and tax coupons, substantially decreases the number of bank personnel involved in the process of accepting tax deposits. Thus, as fewer individuals are involved in the tax deposit process, the danger of human error, and financial penalties resulting therefrom, is lessened.

SUMMARY OF THE INVENTION

The present invention system includes an automated system and method to enable a depositor to make a tax deposit by communicating via a communication link with a voice synthesizer located at a primary processing center. The voice synthesizer, such as a DECtalk voice synthesizer, is one of a multiple number of voice synthesizers linked to a central processor, also located at the primary processing center. The depositor and the voice synthesizer engage in a question and answer exchange wherein the depositor provides tax deposit information to the voice synthesizer. The invention is capable of including voice synthesizers which utilize speech recognition techniques that are speaker independent. Thus, the present invention is capable of recognizing tax deposit information made by using the telephone tones, computer or voice. Alternatively, recorded speech systems may be utilized.

The voice synthesizer transfers the tax information via a communication link such as a telephone line, to the processor, thus eliminating the depositor's need to mail the deposit or physically travel to the bank, to manually prepare a federal tax deposit coupon and to write a tax deposit check. A short exchange of information with a voice synthesizer, usually less than one minute, replaces a depositor's efforts under the traditional systems.

The processor is linked to a multiple number of storage means, such as main memory, hard disks, floppy disks, magnetic tapes or other conventional storage media. The processor is also linked to a multiple number of peripheral devices such as conventional magnetic tape generators and printers. The printers may be laser printers, dot matrix printers or any other conventional printer.

While receiving the deposit information, the voice synthesizer automatically transfers the data to the processor via communication links. The processor then stores the tax information as it is received in a storage medium, such as the processor's main memory.

Upon receipt of data sufficient to identify the depositor, the processor allows the deposit to proceed and complete. The present invention includes multiple storage mediums accessible by the processor to record information on authorized depositors and due dates for tax deposits. Each bank determines which depositors are authorized to use the present invention, while the government agency determines the due dates for tax deposits. Bank personnel or other system controllers enter the authorized depositors and due dates information into the processor's storage mediums through remote terminals located at each bank or other suitable location. Each remote terminal is linked to the processor through a communication link, such as a modem via telephone lines.

After a tax deposit is verified, the processor stores the information concerning all the tax deposits made over a specified time period, e.g. twenty-four hours, or during the bank's normal operating hours. At the end of the acceptance period of tax deposits, the invention processor records all the tax deposit information received that day for each bank on a storage medium such as a magnetic tape. The storage medium is then either physically transferred to a bank, or the processor may transfer the information to a bank processor via a communication link. The bank may then use the daily tax deposit information recorded on the storage medium to transfer the tax deposits from the depositor's accounts to a bank revolving account.

In a further aspect, the present invention discloses a method for the bank to generate "tax deposit coupons" on the due date for the tax deposit. A "tax deposit coupon" is a hard copy of tax deposit information. Each government requiring tax deposits specifies the information contained in a tax deposit coupon, as well as the format of the information on the coupon. Traditionally, the government agency provides blank coupons to depositors, the depositor prints the tax information on the coupon and bank personnel date stamp the coupon when the deposit is made. The automatic generation of tax deposit coupons provides for highly accurate entry of tax deposit information and date stamping of a tax deposit coupon. As this work is traditionally performed by depositors and bank personnel, the present automatic invention reduces the risk of human error and thus the penalties assessed against a depositor or a bank.

As stated above, the receipt of a tax deposit coupon triggers the bank's duty, by law, to electronically transfer the tax deposit to the government agency by 12:00 noon the next day. Under the present invention, the depositor provides the tax deposit information to a voice synthesizer via a communication link. Thus, the depositor does not manually fill out a tax coupon and the bank does not receive a tax coupon. Further, by law, the depositor's actions in recording a tax deposit via the present invention do not trigger the bank's duty to transfer the deposit within one day. Instead the tax deposit due date as calculated by the processor is stored in a storage medium with other information, and the deposit is transferred at an appropriate later date.

Each day at the end of the acceptance period, the processor merges and stores the information recorded that day in a cumulative record stored in a storage medium such as the main memory. Next, the processor accesses the information in the cumulative record and compares the due date on each tax deposit to determine if the tax deposit is due the same day. If the tax deposit is due that day, the processor, via a printer, creates a tax coupon for the tax deposit. Tax deposit coupons may either be printed at the primary processing center, or the information may be electronically transferred to a printer located at the bank corresponding to the tax deposit, and printed there.

When a tax deposit is due, the money must be transferred from the bank's account to the TT&L Account. Thus, the processor creates a record of the tax deposits due and stores the record in a storage medium such as a magnetic tape. The storage medium is transferred to the bank, which in turn may use the information to transfer the tax deposits from the bank's revolving account to a TT&L Account.

This aspect of the present invention allows the bank to gain additional float time on the tax deposits. Because a tax coupon is not generated until the day a tax deposit is due, the bank is not required by law to deposit the tax deposit money into a TT&L Account. Instead, the bank may deposit the money into a revolving account and earn interest on the money.

The present invention also allows a depositor to make an early tax deposit and avoid penalties the government assesses on depositors for late payments. If a depositor is unsure of a due date, under the present system the depositor may make a tax deposit well ahead of the due date and be assured that the tax deposit will be timely. Alternatively, the invention through an automatic penalty protection technique allows the taxpayer to enter future payroll dates through the voice synthesizer. After a depositor has entered tax deposit information, the depositor may input payroll dates whose tax deposit due dates are in the future. The payroll and tax deposit due dates are transferred to the processor and stored in an automatic penalty protection storage medium, such as disk memory. Later, when the depositor inputs additional tax deposit information, the additional information is compared to the payroll and tax deposits due dates input through the automatic penalty protection technique. If a match is found the payroll and future tax deposit due dates are removed from the automatic penalty protection storage medium. On the tax deposit due date, if the corresponding deposit has not been made, the processor generates a reminder that the deposit is due. A system controller or other suitable reminder service communicates the reminder to the depositor, generally by telephone, or any other conventional means.

Additionally, the present invention alerts a depositor to variations in the depositor's depositing habits. When a depositor consistently inputs tax deposit information less than two banking days before the tax deposit due date, the present invention records the depositor's habit. Later, if the depositor makes a deposit two or more banking days before the due date, the present invention alerts the depositor to the variation. Thus, if a depositor incorrectly enters the payroll date, the present invention will alert the depositor to the fact that the deposit was made in variation with previous depositing habits, and allow the depositor to either validate the payroll date or re-enter the payroll date and amount. Similarly, if the depositor enters the present date as the payroll due date, the present invention will alert the depositor as to the possible error.

In yet a further aspect, the invention embraces a method for automatically producing a paper trail of all tax deposits and for automatically producing reports on depositors or other data on tax deposits. As the tax deposit information is received, the processor arranges the information in a predetermined format and transfers it to a printer. The printer then creates a second record of the tax deposit information. The processor also arranges the tax deposit information, the authorized depositor information, the due date information, and any other information stored in the processor's storage mediums, in report arrangement. The newly arranged information is transferred to a printer where a hard copy is generated.

The voluminous reports required by the government agency are arranged in a predefined format and transferred to storage mediums, such as microfiche and magnetic tapes. Each government agency specifies the storage medium. The automatic generation of these reports significantly reduces the risk of human error and thus decreases the amount of financial penalties assessed based on report errors.

These and other aspects and advantages of the present invention as set forth in the following detailed description wherein like numerals represent like elements throughout.

DETAILED DESCRIPTION

Figure 1:
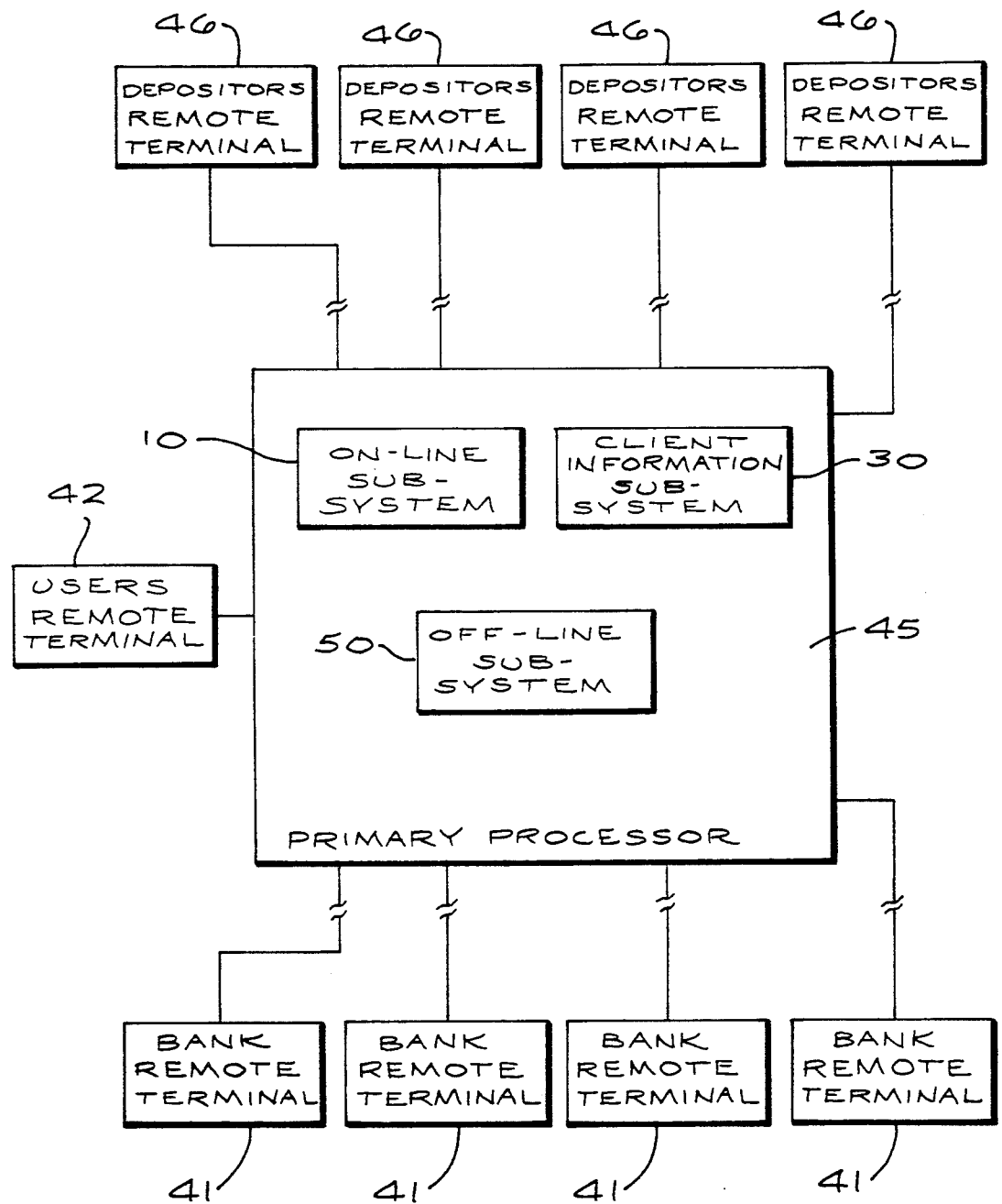
FIG. 1 is a simplified block diagram showing the interaction between three major subsystems of the present invention and the remote terminals which may access the processor.

Turning to the drawings, FIG. 1 is a block diagram of the automated tax deposit system of the invention. A primary processor 45 coordinates the invention. The primary processor 45 includes three major subsystems, one or more on-line subsystems 10, one for each subscribing bank, one or more client information subsystems 30, one for each subscribing bank, and one or more off-line subsystems 50, one for each subscribing bank.

The on-line subsystem 10 provides for the inputting of tax deposit information through voice synthesizers linked to the primary processor 45. The voice synthesizers and the primary processor 45 are located at a primary processing center. A depositor communicates with a depositor's remote terminal 46 via a communication link, such as a telephone line, to a voice synthesizer through a series of questions and answers. The voice synthesizer transfers the information to the primary processor 45 where the information is stored in a storage medium, such as disk memory. The primary processor 45 may be any conventional processor.

The primary processor 45 includes a multiple number of peripheral devices, such as CRT displays, magnetic tape generators, printers, main memory storage, microfiche, hard disks and floppy disks. The printers may be laser printers, dot matrix printers or any other conventional printers. The magnetic tape generators may be any conventional magnetic tape drive, such as a Kennedy 9600. Main memory storage, hard disks and floppy disks, magnetic tapes, microfiche, and hard copies produced by the printers will be referred to generally as storage medium.

The client information subsystem 30 is accessed by one or more bank remote terminals 41 located at each remote subscriber bank and one or more user's remote terminals 42 located at the primary processing center. This subsystem allows bank personnel to input and update information on authorized depositors through the bank remote terminals 41 connected by communication links to the primary processor 45. System controllers can input and update tax deposit due dates through user's remote terminals 42 which are also connected to the processor 45. The information is stored by the primary processor 45 in storage medium.

Finally, the off-line subsystem 50 updates cumulative records stored in storage mediums within the primary processor 45 with each day's tax deposits. This subsystem also updates cumulative journal and audit records on information on the interactions between each depositor and the relevant voice synthesizer generated with a tax deposit, as well as the interactions between the primary processor 45 and the bank remote terminal 41 used to input information into the client-information subsystem 30.

Within the off-line subsystem 50 the primary processor 45 arranges the information in a predefined format required by the government agency and then stores the information on a storage medium, such as a magnetic tape, and on tax coupons. The off-line subsystem 50 also arranges the tax deposit information in a bank defined format for use by a bank's processor and stores the information on another storage means, such as a magnetic tape. Finally, the off-line subsystem 50 creates reports required by the government agency and banks and stores them on a storage medium, such as hard copies or magnetic tapes.

Each subsystem is a part of the primary processor 45. The processes performed by each subsystem can take place simultaneously or one after the other. In particular, as will be described in more detail below, the off-line subsystem 50 accesses information received by the primary processor 45 and stored in storage mediums during the time the on-line subsystem 10 is operating.

Similarly, the off-line subsystem 50 accesses information received by the primary processor 45 and stored in storage mediums during the client information subsystem 30 operating time. Thus, in the illustrated embodiment, the on-line subsystem 10 and the client information subsystem 30 may operate simultaneously during specified time periods. At the end of the specified time period, the on-line subsystem 10 and the client information subsystem 30 stop operating. At this time, the off-line subsystem 50 begins operating. Thus, the storage mediums accessed by the off-line subsystem 50 are constant and unmodified by the other subsystems. This provides for accurate storage and maintenance of the information input or modified during the on-line subsystem 10 and the client information subsystem 30.

Figure 2:
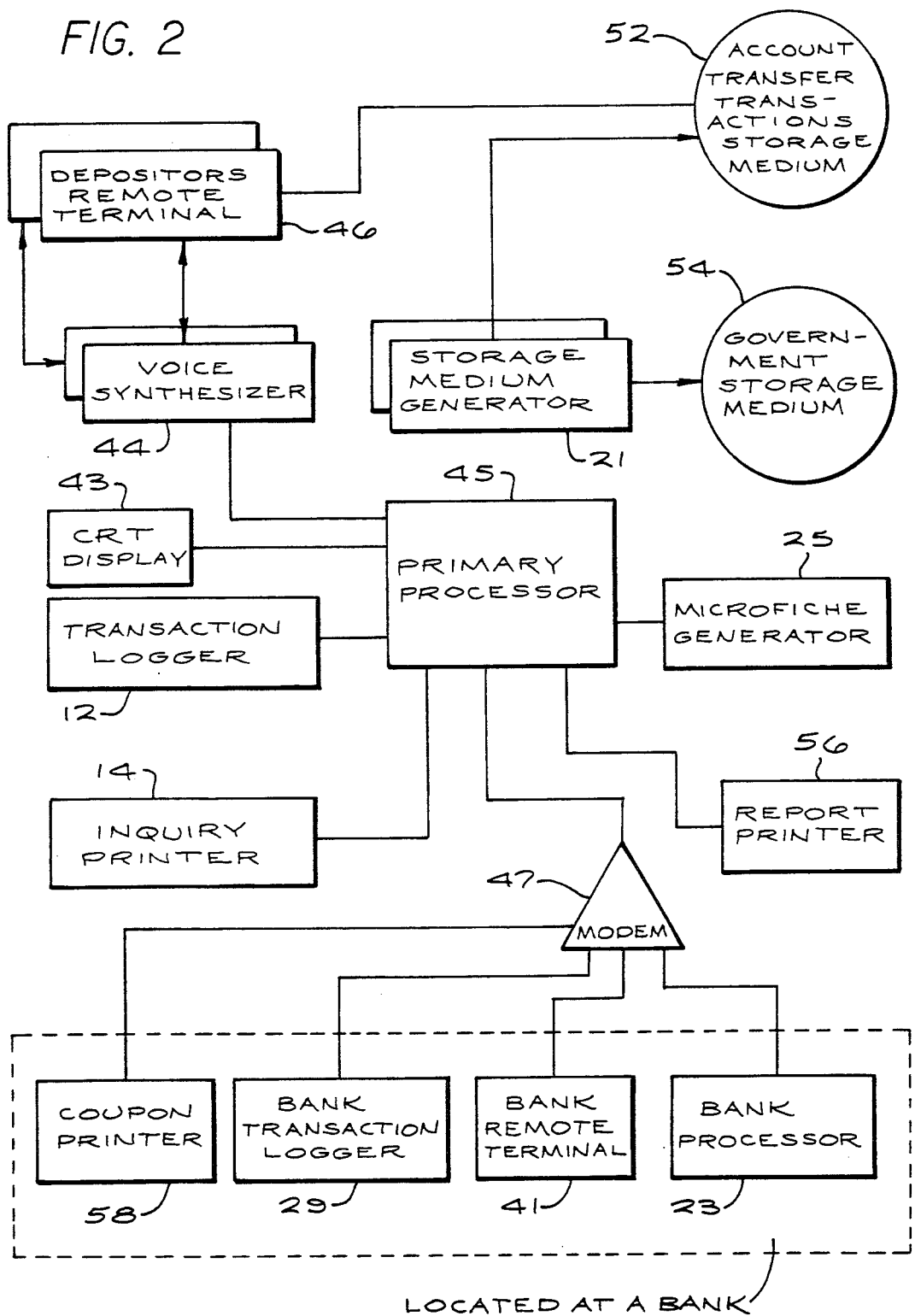
FIG. 2 is a detailed block diagram of the present system.

FIG. 2 is a detailed block diagram of the present invention. The dotted lines designate the peripheral devices which may be located at a bank or other suitable location. The peripheral devices outside the dotted lines may be located at a primary processing center. Many of the apparatus shown in FIG. 2 will be described in more detail below.

The primary processor 45 controls the interaction between the apparatus. Multiple voice synthesizers 44, such as DECtalk units, are connected to the primary processor 45. A depositor inputs tax deposit information into the system through a depositor's remote terminal 46, such as a touch tone telephone or a personal computer, which is connected to a voice synthesizer 44 via a communication link, such as a conventional telephone line. The interaction between the depositor's remote terminal 46 and a voice synthesizer 44 is described in more detail in the discussion of FIG. 5. The voice synthesizer 44 receives the tax deposit information input by the depositor and transfers the information to the primary processor 45. The information is then stored in several storage mediums, such as a disk memory, and is printed on a hard copy, such as by a printer to produce a tax deposit record of the tax deposit information. Although the discussion of the storage medium on which the tax deposit information in stored will be directed toward disk memory, it will be understood that the storage medium on which the information may be stored may be any suitable storage medium, such as those described above. Further, a second copy of the tax information may be stored in any storage medium, such as magnetic tape. Printing the information with a printer is only one available option.

The primary processor 45 is also coupled to a plurality of storage medium generators 21 located at the primary processing center, one assigned to each bank. A storage medium generator, such as a magnetic tape drive, receives information and stores it on a storage medium, such as a magnetic tape or other suitable medium. The storage medium generators 21 are used to record information on storage mediums, called an account transfer transactions storage medium 52 and a government storage medium 54.

The primary processor 45 also accesses the tax deposit information stored in the disk memory to determine which tax deposits are due the same day. The primary processor 45 then formats the tax deposit information of taxes due the same day according to a predefined government format for use by a government agency and stores the information, via the storage medium generators 21, in the government storage medium 54. This information is required by the IRS or other government agency. A conventional microfiche generator 25, located at the primary processing center, is also linked to the primary processor 45. The primary processor 45 stores the tax deposit information on conventional microfiche via the microfiche generator 25.

The primary processor 45 is further coupled to a conventional CRT display 43, a transaction logger 12 and an inquiry printer 14, all located at the primary processing center. The CRT display 43 is used for displaying tax deposit information from the primary processor 45. In contrast, the transaction logger 12 generates a hard copy of each tax deposit as it is made from information received from the primary processor 45. The inquiry printer 14 is used to create hard copies of reports in a predefined format using data from the primary processor 45 concerning the availability of components of the system for receiving data.

The primary processor 45 also is coupled to a multiple number of bank processors 23 located at each bank or other suitable location via a modem 47. The primary processor 45 transmits tax deposit information input to each subscribing bank through the modem 47 as it is input. A bank transaction logger 29, also located at the bank, is linked to the primary processor 45 via the modem 47. As the primary processor 45 receives tax deposit information, the primary processor 45 transfers the information via the modem 47 and telephone lines to the bank transaction logger 29 which creates a hard copy of each tax deposit. This gives the bank a backup copy of tax deposits if an emergency arises.

The primary processor 45 accesses the tax deposit information stored in the disk memory and formats the information for use by a bank processor 23 located at the bank or other suitable location. The primary processor 45 then stores the information, via the storage medium generators 21, on the account transfer transactions storage medium 52. The account transfer transactions storage medium 52 is then either physically transferred or electronically transferred through the modem 47 to the bank processor 23 for use in transferring tax deposits from each depositor's account to the bank's account. Finally, the bank processor 23 accesses the information stored on the account transfer transactions storage medium 52 and processes that information to transfer the tax deposits from each depositor's account into the bank's revolving account.

The primary processor 45 is also linked to a bank remote terminal 41 located at the bank via the modem 47. Bank personnel perform file maintenance work and inputting of new depositor information through the bank remote terminal 41 to the primary processor 45.

A third printer, a coupon printer 58, is also linked to the primary processor 45 via the modem 47 and located at the bank to print tax deposit coupons for the IRS or other government agency, as well as letters to depositors. As stated above, the government storage medium 54 stores the information on tax deposits due the same day. This information is also stored in a storage medium, such as disk memory, accessible by the primary processor 45 for use in controlling the coupon printer 58 in the generation of tax deposit coupons.

A report printer 56 is linked to the primary processor 45 and located at the primary processing center. The report printer 56 allows the primary processor 45 to print daily reports on tax deposits, and letters to depositors concerning due date reminders, security code numbers or other information. In alternative embodiments, the coupon printer 58 may be located at the primary processing center and/or the report printer 56 may be located at the bank.

In alternative embodiments, the apparatus shown in FIG. 2 may be replaced by conventional apparatus of varying types and designs which perform the same function without departing from the concept of the present invention. Voice synthesizers may be utilized that are capable of utilizing speech recognition techniques that are speaker independent and allow a depositor to input tax deposit information through push button phones, computers, voice or any other tone or voice generator. Stored speech systems may replace voice synthesizers. Printers may be interchanged and used to perform any or all of the system printing needs. CRT displays may be eliminated. Of course it will be understood that a variety of conventional apparatus may be utilized with the present system. It will also be understood that each peripheral device may be located at the primary processing center or at a bank.

Figure 3:
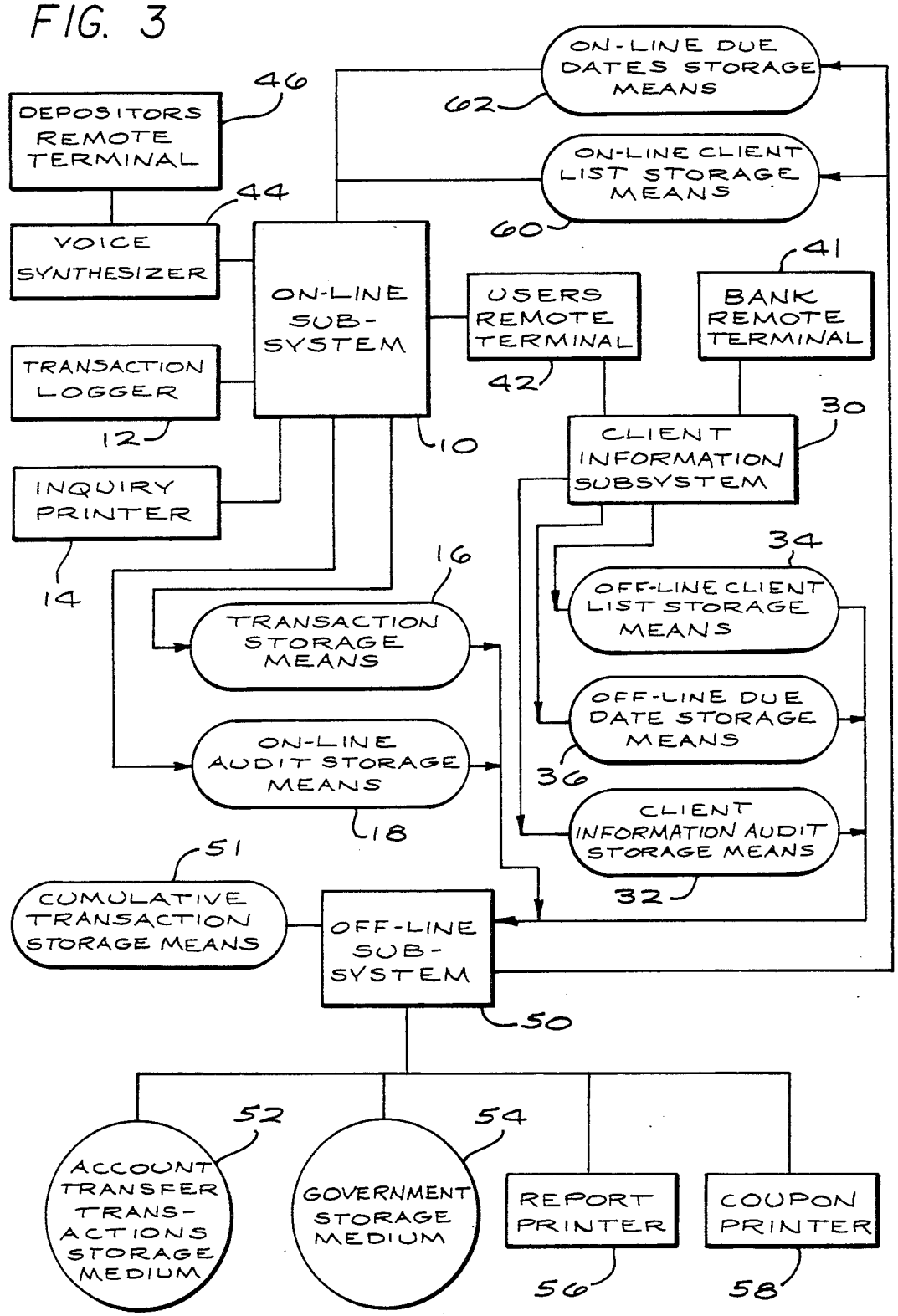
FIG. 3 is a block diagram showing the interaction between the three major subsystem of the present invention, the on-line subsystem, the client information subsystem and the off-line subsystem.

FIG. 3 is a detailed block diagram of the interaction between the three major invention subsystems. As shown in FIG. 2, each subsystem is a part of the primary processor 45. In the on-line subsystem 10 the primary processor 45 provides for the inputting of tax deposit information. The client information subsystem 30 provides for inputting and updating of client information into the primary processor 45 through bank remote terminals 41 located at the bank and tax deposit due date information through user's remote terminals 42 located at the primary processing center. Finally, in the off-line subsystem 50, the primary processor 45 updates cumulative files with each day's transaction activity, creates storage mediums with tax deposit information for government agencies and banks, and prints daily reports and coupons. Each subsystem is described in more detail in the description of FIGS. 4 through 7.

In the on-line subsystem 10, a multiple number of voice synthesizers 44 are linked to the primary processor 45. The voice synthesizers 44 and primary processor 45 are all located at the primary processing center. Tax deposit information is provided to the voice synthesizer 44 by a tax depositor from a remote location through a depositor's remote terminal 46 connected to the voice synthesizer 44 through communication links, such as telephone lines. The deposit information is then transferred to the primary processor 45 by the voice synthesizer 44. The primary processor 45 is linked to two storage mediums, an on-line client list storage means 60 and an on-line due dates storage means 62 located in storage mediums accessible by the primary processor 45, such as disk memory. The primary processor 45 verifies the depositor's identity and depositor status through a comparison to information stored in the on-line client list storage means 60. The depositor's identity and status may be verified by using any suitable access code system. Generally, one or more unique personal identification codes are assigned to each depositor to assure security within the system. A similar system is used by bank automatic teller machines. The primary processor 45 verifies the timeliness of the tax deposit through a comparison to the on-line due dates storage means 62.

The transaction logger 12 is also coupled to the primary processor 45. As information is input by the depositor, the primary processor 45 creates a hard copy of each tax deposit via the transaction logger 12. The transaction logger 12 may be a conventional printer or any other suitable printing or recording apparatus.

The primary processor 45 is also linked to a user's remote terminal 42 located at the primary processing center or any other suitable location. By using the user's remote terminal 42, a system controller may access the primary processor 45 through the on-line subsystem 10 to determine the status of the on-line subsystem 10. The inquiry generator 14 is linked to the primary processor 45 to allow the primary processor 45 to create hard copies of inquiries made through the user's remote terminal 42.

The on-line subsystem also executes an automatic penalty protection technique. In the on-line subsystem 10, the primary processor 45 allows the depositor to input payroll dates whose tax deposit due dates are in the future. The primary processor 45 stores the payroll and future tax deposit due dates in the on-line client list storage means 60. Later, when a depositor inputs additional tax deposit information, the primary processor 45 accesses the on-line client list storage means 60 to determine if the newly input tax deposit information matches information previously input through the automatic penalty protection technique. If a match is found, the information is deleted from the on-line client list storage means 60. By noon of each day, the primary processor 45 accesses the on-line client list storage means 60 and using a specified reminder time period of, for example, three days creates a record of the depositors, with tax deposit due dates on that day or within the specified reminder time period, who have not made deposits corresponding to tax deposits due on that day or within the specified reminder time period. A system controller or any other suitable reminder service, may then access the overdue tax depositor record through a user's remote terminal 42, and communicate a reminder that the tax deposit is due to the depositor.

The primary processor 45 is also linked to a transaction storage means 16 and an on-line audit storage means 18 located in storage mediums accessible by the primary processor 45, such as disk memory. The tax deposit information input through the voice synthesizer 44 is stored in the transaction storage means 16. Further, during the on-line subsystem 10 operating time the primary processor 45 stores all interaction between the depositor's remote terminal 46 and the voice synthesizers 44 and stores the interaction in the on-line audit storage means 18.

The second major subsystem of the tax deposit processing system is the client information subsystem 30. During the client information subsystem 30 operating time, through the bank's remote terminal 41, located at the bank or other suitable location, bank personnel may input and edit information concerning depositors. Similarly, systems controllers may input and edit tax deposit due date information through a user's remote terminal 42 located at the primary processing center.

The primary processor 45 is linked to an off-line client list storage means 34, an on-line due date storage means 36 and a client information audit storage means 32, all located in storage mediums accessible by the primary processor 45, such as disk memory. The primary processor 45 records information on depositors input by bank personnel through the bank remote terminal 41 in the off-line client list storage means 34. Similarly, the primary processor 45 stores information concerning tax deposit due dates input by system controllers through the user's remote terminal 42 in the on-line due date storage means 36. As during the on-line subsystem 10 operating time, during the client information subsystem 30 operating time the primary processor 45 stores interaction between the bank's remote terminal 41 and the primary processor 45 in the client information audit storage means 32.

The third major subsystem of the tax deposit processing system is the off-line subsystem 50. During the time the off-line subsystem 50 is operating, the primary processor 45 accesses the transaction storage means 16 created during the on-line subsystem 10 operating time to create the account transfer transactions storage medium 52. A bank may then utilize the account transfer transactions storage medium 52 to transfer money from a depositor's account into the bank's account.

The primary processor 45 is linked to a cumulative transaction storage means 51 located in a storage medium accessible by the primary processor 45, such as disk memory. During the off-line subsystem 50 operating time, the primary processor 45 accesses the transaction storage means 16 and merges the file with previously input tax deposits and stores the combined information in the cumulative transaction storage means 51. The primary processor 45 then accesses the cumulative transaction storage means 51 and formats the information into predefined formats as required by the government agency. The primary processor 45 creates the government storage medium 54 via a storage medium generator 21 to be given to the government agency for processing of tax deposits. The same information is also used to create tax deposit coupons for those depositors not yet approved for alternative processing by the government agency.

The primary processor 45 is also coupled to the report printer 56 through which the primary processor 45 generates hard copies of reports on the tax deposit information recorded by the primary processor 45 during the on-line subsystem 10. The coupon printer 58 is also attached to the primary processor 45 for printing of tax deposit coupons required by the government agency.

Additionally, the primary processor 45 is linked to the off-line client list storage means 34 generated by the primary processor 45 during the client information subsystem 30 operating time, the on-line client list storage means 60, the off-line due date storage means 36 and the on-line due date storage means 62. The primary processor 45 accesses the off-line client list storage means 34 and merges the information with the information contained in the on-line client list storage means 60. The merged information is then stored by the primary processor 45 in the on-line client list storage means 60. The primary processor 45 also accesses the off-line due date storage means 36 and combines the information with information previously stored in the on-line due date storage means 62. The merged information is then stored in the on-line due dates storage means 62.

Figure 4:
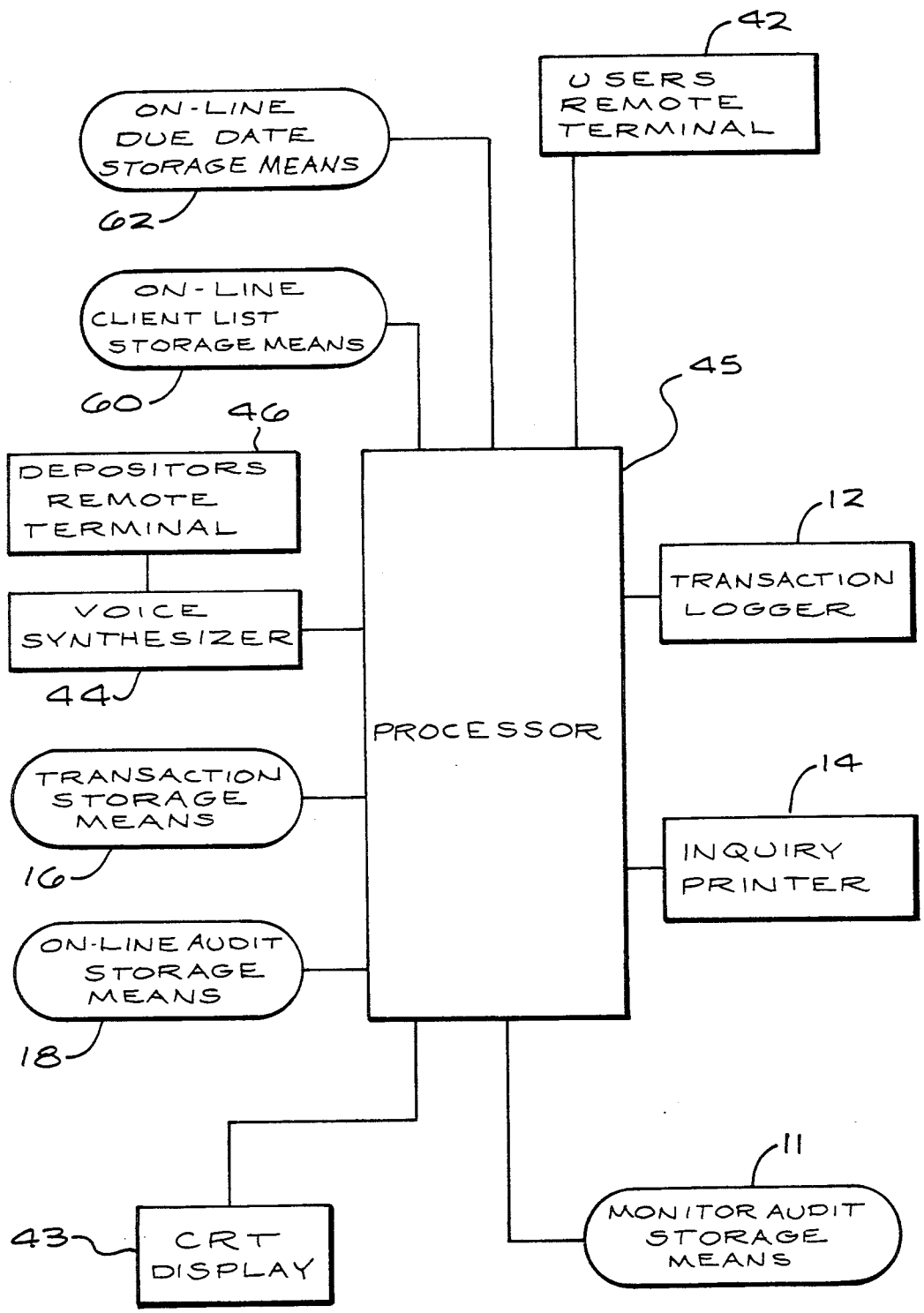
FIG. 4 is a detailed block diagram of the on-line subsystem.
Figure 5A:
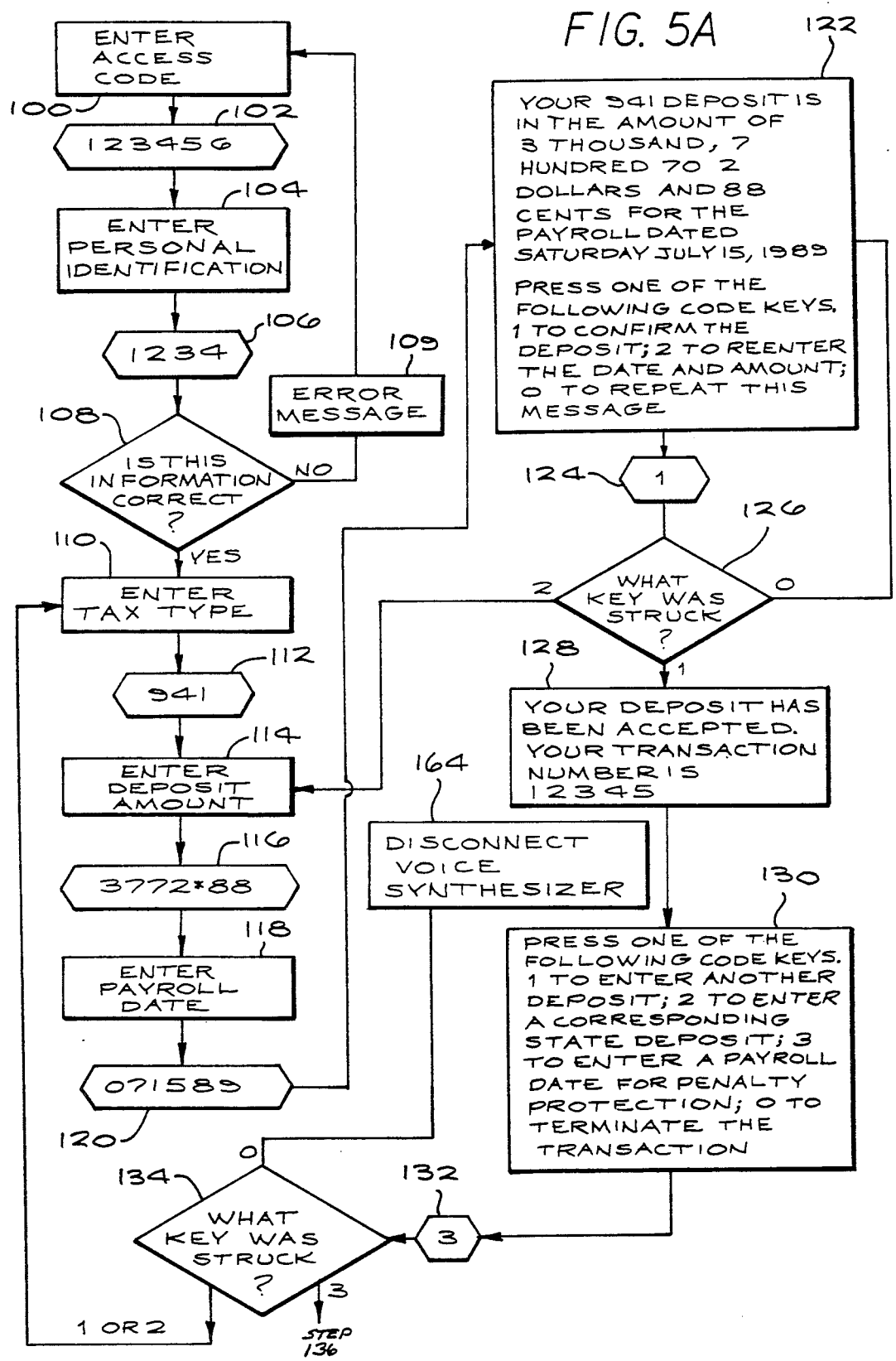
FIG. 5, which consists of FIGS. 5A and 5B, is a flow chart showing operation of the present system during an illustrative exchange between a depositor and a voice synthesizer.
Figure 5B:
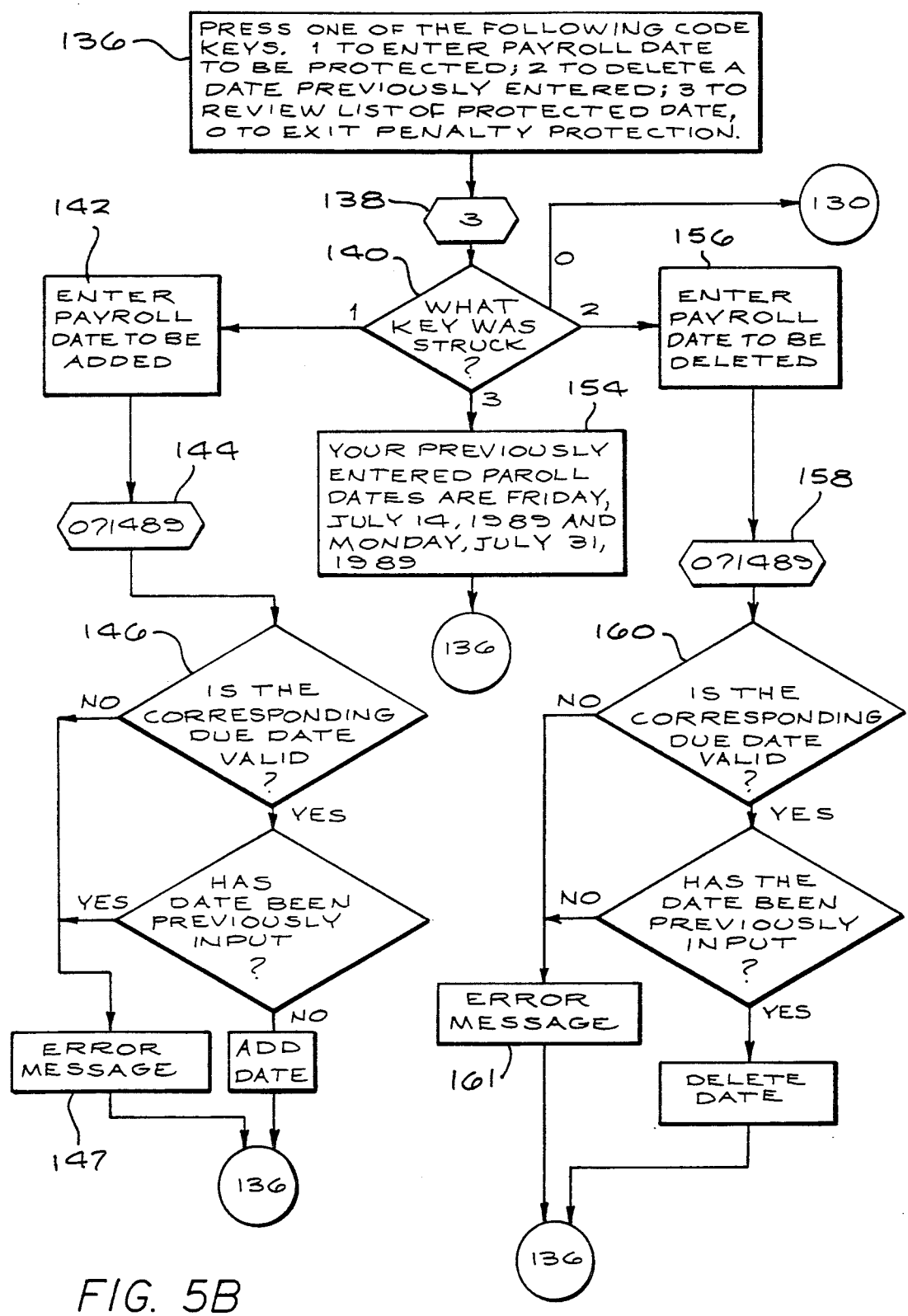

FIG. 4 shows a more detailed block diagram of the on-line subsystem 10. A depositor provides tax deposit information to the on-line subsystem through the depositor's remote terminal 46. The depositor's remote terminal may be a touch tone telephone, a personal computer or any other suitable input device. The voice synthesizer 44 and the depositor, through the depositor's remote terminal 46, engage in a question and answer exchange wherein the depositor's identification number, and deposit information is provided through the voice synthesizer 44. FIG. 5 and the accompanying description provide a more detailed description of this exchange.

The primary processor 45, is linked to the on-line due dates storage means 62, the on-line client list storage means 60, the transaction storage means 16 and the on-line audit storage means 18. After a depositor has provided initial tax deposit information identifying the depositor, the primary processor 45 verifies that the depositor has entered valid identifying information by a comparison to the information stored in the on-line client list storage means 60. Once this information is verified, the depositor may enter the remaining deposit information through the voice synthesizer 44 via the depositor's remote terminal 46. The primary processor 45 then verifies the accuracy of the tax deposit information against the information stored in the on-line due dates storage means 62.

In yet a further aspect of the invention, the primary processor 45 examines each payroll date to determine if the depositor is following previously established depositing habits. A depositing habit is established when a depositor makes two consecutive tax deposits less than two banking days before the corresponding tax deposit due date. If the depositor has established a depositing habit, the primary processor 45 stores the information that a depositing habit exits, thereby defining a habit flag, and the depositor's identification in the on-line client list storage means 60.

When a depositor makes a deposit, and enters the payroll date, the primary processor 45 calculates the tax deposit due date corresponding to the payroll date. The primary processor 45 then accesses the on-line client list storage means 60 to determine if the depositor has established a depositing habit. If the depositor has established a depositing habit, the primary processor 45 compares the time difference between the input tax deposit date and the calculated tax deposit due date to determine if the tax deposit has been made more than one banking day prior to the tax deposit due date. If so, the primary processor 45 transmits a message to the depositor via the voice synthesizer 44 and the depositor's remote terminal 46, that the payroll date is an exception to the depositor's depositing habits. The depositor may then re-enter the payroll date and amount or validate the previous entry.

The primary processor 45 stores tax deposit information in the transaction storage means 16. The primary processor 45 produces a hard copy of each deposit on the transaction logger 12 as each deposit is made. The primary processor 45 records any interaction between the voice synthesizer 44 and the depositor's remote terminal 46 in the on-line audit storage means 18.

After a depositor inputs tax deposit information, the depositor may utilize the automatic penalty protection technique. The depositor may input information through the depositor's remote terminal 46 concerning tax deposits whose due dates are in the future. As stated above in connection with the description of FIG. 3, the primary processor 45 will then automatically create a list of depositors who have not made tax deposits corresponding to the future payroll dates previously input.

The primary processor 45 is linked to a monitor audit storage means 11 located in a storage medium accessible by the primary processor 45, such as disk memory. All interaction between the primary processor 45 and a voice synthesizer 44 is recorded in the monitor audit storage means 11. The primary processor 45 is also linked to the CRT display 43. A system controller may access the primary processor 45 through the user's remote terminal 42 to determine the availability of the on-line subsystem 10 or the status of a voice synthesizer 44 for receiving information. The primary processor 45 creates hard copies of reports of tax deposits and summaries of the interactions between the depositor's remote terminal 46 and the voice synthesizer 44 or between the voice synthesizer 44 and the primary processor 45 by transferring the information to the inquiry printer 14 in a predefined format. The inquiry printer then prints the reports or summaries. The primary processor 45 can also display information requested by a system controller through the user's remote terminal 42 by transferring the information to the CRT display 43 where it is displayed on a screen.

FIG. 5 is a flow chart of an exchange between a depositor through a depositor's remote terminal 46 and a primary processor 45 located at the primary processing center. The depositor's remote terminal 46 is connected to a voice synthesizer 44 through communication links, such as telephone lines. In turn, the voice synthesizer 44 is coupled to the primary processor 45. In each exchange, the primary processor 45 transmits information to the depositor's remote terminal 46, via the voice synthesizer 44. The depositor transmits information to the primary processor 45 through the depositor's remote terminal 46 and the voice synthesizer 44.

The exchange between the voice synthesizer 44 and the depositor's remote terminal 46 begins at step 100. Initially, the primary processor 45 requests information from the depositor identifying the depositor. This process can be performed using any suitable access code security system, such as those used by bank automatic teller machines. In step 100, the primary processor 45 instructs the depositor to "enter your access code." The primary processor also assigns a transaction number to the exchange. In step 102, the depositor responds and transmits the numbers "123456". This data is passed through to the primary processor 45, which stores the information. The primary processor 45 in step 104, requests the depositor to "enter your personal identification number." The depositor responds, in step 106, by transmitting the numbers "1234".

In step 108, the primary processor 45 then verifies the depositor's access code and personal identification code by accessing the information stored in the on-line client list storage means 60 (FIG. 4) and comparing it to the information input by the depositor. If the depositor's access code and personal identification code are incorrect, in step 109 the primary processor 45 transmits an error message to the depositor and then returns to step 100 to prompt the depositor to enter the access and personal identification codes again.

If the depositor has entered correct access and personal identification codes, in the next group of steps the depositor provides the tax type, deposit amount and pay date information to the primary processor 45. In step 110, the primary processor 45 transmits a message to the depositor requesting that the depositor enter the tax type. In step 112, the depositor responds by inputting a tax type code.

The primary processor 45 then transmits a request to the depositor, in step 114, that the depositor "enter the deposit amount." In step 116, the depositor transmits the amount "3772*88". In this example, the "*" is used as a decimal point.

In step 118 the primary processor 45 transmits a message to the depositor requesting that the depositor "enter the payroll date." In step 120, the depositor responds with the payroll date "071589".

Then, the primary processor 45 transmits a verification message stating the deposit type, the deposit amount and the payroll date back to the depositor for verification by the depositor that the information is correct. In step 122, the primary processor 45 transmits the deposit amount and payroll date and a message requesting that the depositor press one of a set of keys to confirm the deposit, reenter the payroll date and deposit amount, or repeat the verification message. In step 124, the depositor responds by striking one of the specified keys.

In step 126, the primary processor 45 branches to three different steps depending on the depositor's response in step 124. If the depositor has chosen to reenter the payroll date and deposit amount, the primary processor 45 returns to step 114. If the depositor has chosen to have the verification message repeated, the primary processor 45 returns to step 122. Finally, if the depositor has confirmed the payroll date and deposit amount, the primary processor 45, in step 128, and transmits a message stating that the deposit has been accepted and the transaction number.

In step 130, the primary processor 45 transmits a message requesting that the depositor press one of a set of keys to enter another tax deposit, enter a corresponding state tax deposit, enter a payroll date in order to activate the automatic penalty protection technique, or terminate the tax deposit transaction. In step 132, the depositor responds by striking one of the specified keys.

Depending on the depositor's choice, in step 134 the primary processor 45 branches to four different steps. If the depositor has chosen to enter another tax deposit or to enter a corresponding state tax deposit, the primary processor 45 returns to step 110. If the depositor has chosen to enter a payroll date in order to activate the automatic penalty protection technique, the primary processor 45 executes step 136. If the depositor has chosen to terminate the tax deposit transaction, the primary processor 45 executes step 164 and disconnects the communication link joining the voice synthesizer 44 to the depositor's remote terminal 46.

Step 136 initiates the automatic penalty protection technique. Here, the primary processor 45 allows the depositor to input or edit payroll dates whose tax deposit due dates are in the future. The primary processor 45 will later access the information input at this time to generate a list of tax deposits due which have not been input into the primary processor 45.

In step 136, the primary processor 45 transmits a message requesting that the depositor press one of a set of keys to enter a payroll date to be protected, delete a payroll date previously entered, review a list of protected payroll dates, or exit the automatic penalty protection technique. In step 138, the depositor responds by striking one of the specified keys.

In step 140, the primary processor 45 branches to four different steps depending on the depositor's response in step 138. If the depositor has chosen to enter a payroll date to be protected, the primary processor 45 executes step 142. If the depositor has chosen to review a list of protected payroll dates, the primary processor 45, in step 154, transmits a list of the payroll dates previously entered into the penalty protection technique. The primary processor 45 then executes step 136 to allow the depositor to delete one of the listed dates, add a date or exit the automatic penalty protection technique. If the depositor has chosen to exit the automatic penalty protection technique, in step 138, the primary processor 45 branches to step 130 to allow the depositor to enter another tax deposit, enter a corresponding state tax deposit, enter a payroll date in order to activate the automatic penalty protection technique, or terminate the tax deposit transaction.

If in step 138 the depositor has chosen to enter a payroll date to be protected, the primary processor 45 executes a series of steps beginning with step 142. In step 142, the primary processor 45 requests that the depositor enter a payroll date. The depositor responds by entering a payroll date, in step 144. Next, in step 146, the primary processor 45 determines the tax deposit due date corresponding to the payroll date. If the corresponding tax deposit due date is after the date on which the information is input, and the payroll date has not been previously input, the primary processor 45 stores the payroll date and future tax deposit due date in the on-line client list storage means 60. Then the primary processor 45 returns to step 136.

If the corresponding tax deposit due date is on or before the date on which the information is input, or the payroll date has been previously input, in step 147, the primary processor 45 transmits an error message to the depositor stating that the depositor has input an invalid payroll date. Then the primary processor 45 returns to step 136.

If in step 138 the depositor has chosen to delete a payroll date previously entered, the primary processor 45 executes step 156 and requests that the depositor enter a date to be deleted. The depositor responds by entering a payroll date, in step 158. Next, in step 160, the primary processor 45 determines the tax deposit due date corresponding to the payroll date. If the corresponding tax deposit due date is on or before the date on which the information is input, or the payroll date has not been previously input, in step 161, the primary processor 45 transmits an error message to the depositor stating that the depositor has input an invalid payroll date. Then the primary processor 45 returns to step 136.

If the corresponding tax deposit due date is after the date on which the information is input, and the payroll date has been previously input, the primary processor 45 deletes the payroll date and future tax deposit due date from the on-line client list storage means 60. Then the primary processor 45 returns to step 136.

The steps described in FIG. 5 are for illustration purposes and may be carried out in various orders, adding, omitting or changing steps. Of course it will be understood that a variety of steps may be used without departing from the true spirit and scope of the invention.

Figure 6:
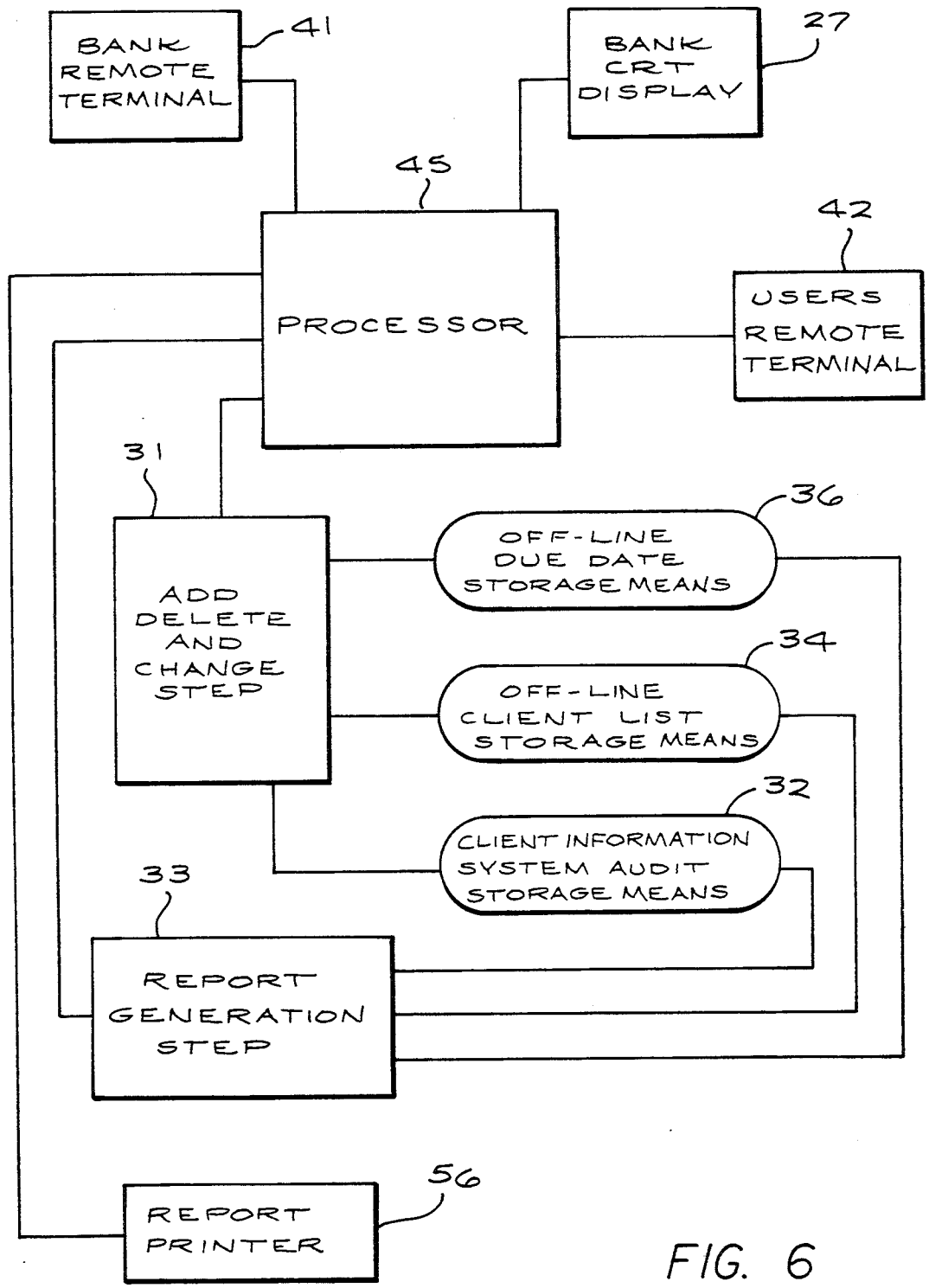
FIG. 6 is a detailed block diagram of the client information subsystem.

FIG. 6 is a detailed block diagram of the client information subsystem 30. The primary processor 45 is linked to a multiple number of bank remote terminals 41; typically each bank is assigned to one remote terminal. The primary processor 45 is also coupled to a user's remote terminal 42 located at the primary processing center.

In client information subsystem 30, the primary processor 45 executes two major steps. The first step is a add, delete and change step 31. During this step, bank personnel may direct the primary processor 45 through the bank remote terminal 41 to add, delete or change information stored in the off-line client list storage means 34. Similarly, system controllers may add, delete or change information stored in the off-line due date storage means 36 by directing the primary processor 45 through the user's remote terminal 42. This information is recorded in a storage medium accessible by the primary processor 45, such as disk memory. The primary processor 45 records the changes made in the off-line client list storage means 34 in the client information system audit storage means 32. The client information system audit storage means 32 acts as a paper trail recording changes made in the off-line client list storage means 34.

The second step executed by the primary processor 45 during the client information system 30 operating time is a report generation step 33. In the report generation step 33, the primary processor 45 generates reports describing the off-line client list storage means 34. The primary processor 45 undertakes the printing of these reports on the report printer 56.

Bank personnel may also make inquiries concerning the client information system audit storage means 32, the off-line client list storage means 34 or the due dates stored in the off-line due date storage means 36 via the bank remote terminal 34. The report printer 56 may be used for printing the processor's 45 responses to these inquiries. Alternatively, the report printer 56 may be used to print reminders to depositors of tax deposit due dates or other letters to depositors, such as letters assigning security code numbers.

Figure 7:
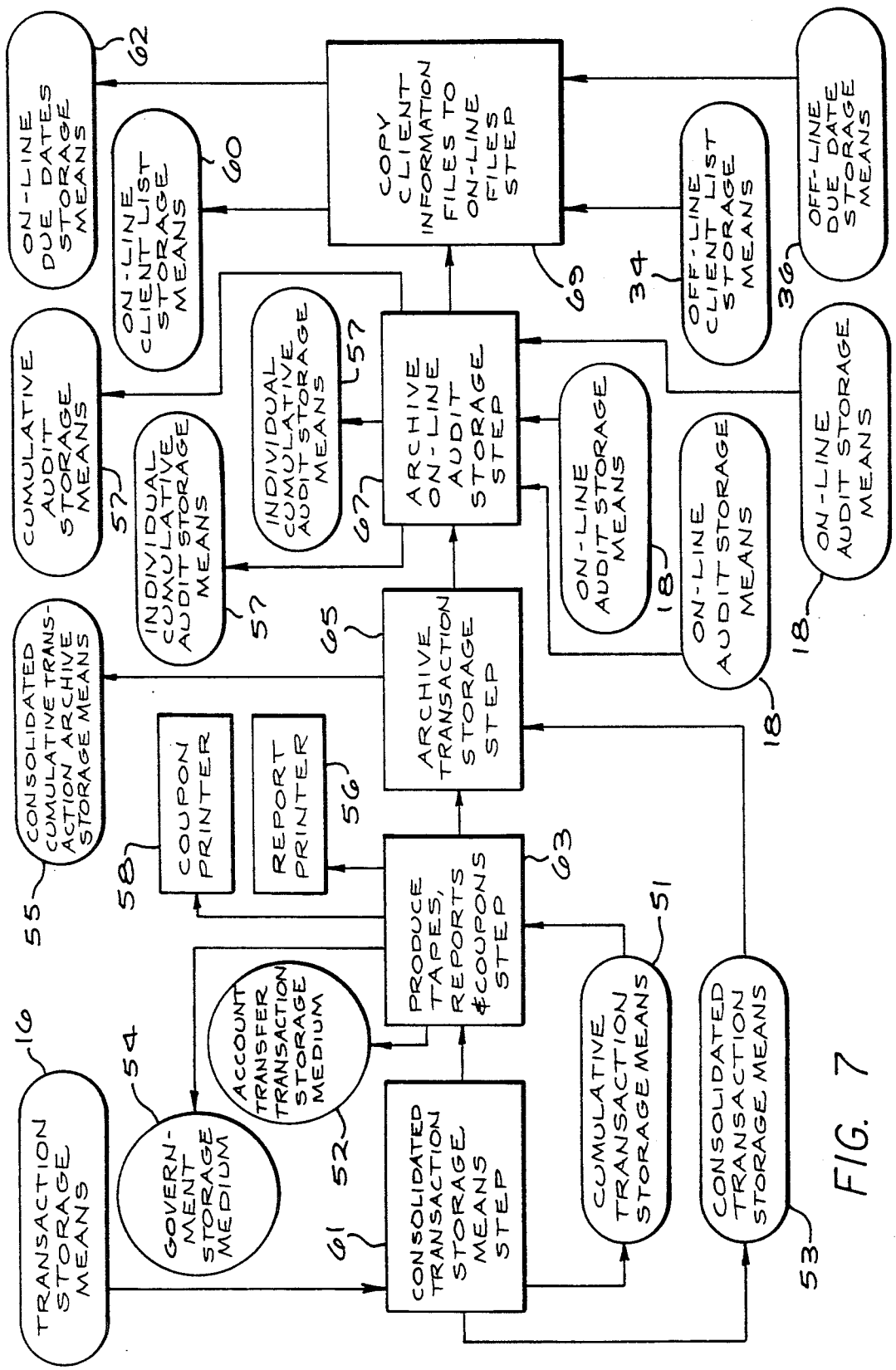
FIG. 7 is a detailed block diagram of the off-line subsystem.

FIG. 7 is a detailed block diagram of the off-line subsystem 50. The off-line subsystem 50 consists of five major steps performed by the primary processor 45. The five steps performed by the off-line subsystem are described in a step by step order. It will be apparent, however, that the primary processor 45 may perform the steps in any order, or perform two or more steps concurrently. The primary processor 45 is linked to a consolidated transaction storage means 53, a consolidated cumulative transaction archive storage means 55, and an individual cumulative audit storage means 57 located in a storage medium accessible by the primary processor 45, such as disk memory.

The off-line subsystem 50 begins with a consolidate transaction storage means step 61 in which the primary processor 45 accesses the transaction storage means 16 created during the on-line subsystem 10 (see FIG. 4). During the consolidate transaction storage means step 61, the primary processor 45 merges the information stored in each transaction storage means 16 with information previously stored in the cumulative transaction storage means 51. Periodically, the primary processor 45 also deletes information on tax deposits whose due dates correspond to the previous due date quarter. Thus, the cumulative transaction storage means 51 is a record of all tax deposits for one quarter. The primary processor 45 also combines the individual transaction storage means 16 into the consolidated transaction storage means 53. This creates a record of all the tax deposits entered into the system within one banking day, or other specified period of time.

The second step in the off-line subsystem 50 is a produce tapes, reports and coupons step 63. The primary processor 45 accesses the cumulative transaction file 51 for information on all tax deposits for one quarter. The primary processor 45 uses this information to generate the government storage medium 54 which records information to be given to the IRS or other government agency. The primary processor 45 formats the information in a predefined format and stores it on the government storage medium 54 via a storage medium generator 21 (not shown). This information is also used to create the tax deposit coupons.

Within the produce tapes, reports and coupons step 63, the primary processor 45 also generates the account transfer transactions storage medium 52 for use by a bank in transferring tax deposits from the depositor's account into the bank account. This is done in the same manner as when the processor stores information on the government storage medium 54. Next, the primary processor 45 prints tax coupons via the coupon printer 58 based on the information stored in the cumulative transaction storage means 51. The report printer 56 allows the primary processor 45 to print daily reports on tax deposits, and letters to depositors concerning due date reminders, deposit receipts, security code numbers or other information.

Step three of the off-line subsystem 50 is an archive transaction storage step 65. During the archive transaction storage step 65, the primary processor 45 accesses the consolidated transaction storage means 53 and merges it with the previously generated consolidated cumulative transaction archive storage means 55 and restores the information in the consolidated cumulative transaction archive storage means 55. This creates a consolidated record of all valid tax deposits and invalid transactions entered into the system.

The fourth step in the off-line subsystem 50 is an archive on-line audit storage step 67. This step results in a multiple number of records. Each record stores all of the interactions between a single voice synthesizer 44 and depositors. During the archive on-line audit storage step 67 the primary processor 45 accesses the on-line audit storage means 18 generated by the primary processor 45 corresponding to each voice synthesizer 44. An on-line audit storage means 18 records all interactions between depositors and an individual voice synthesizer 44 (see FIG. 4). Next, the primary processor 45 combines each on-line audit storage means 18 with previously generated on-line audit storage files and stores in the corresponding individual cumulative audit storage means 57. Thus, each individual cumulative audit storage means 57 contains a cumulative record of the tax transactions made on an individual voice synthesizer 44.

The fifth and final step of the off-line subsystem 50 is a copy client information files to on-line files step 69. During the copy client information files to on-line files step 69, the primary processor 45 accesses the off-line client list storage means 34 created during the client information subsystem 30 operating time, merges the information with previously created on-line client list storage means 60 and stores the merged information in the on-line client list storage means 60. The primary processor 45 also accesses the off-line due dates storage means 36 created during the client information subsystem 30 operating time, merges the stored information with information previously stored in on-line due date storage means 62 and stores the merged information in the on-line due dates storage means 62.

From the foregoing description it will be apparent that a wide variety of other applications, embodiments and formats exist wherein payroll, corporate profit and excise taxes are automatically processed according to the present invention. Of course it will be understood that in alternative embodiments the hardware may be located at either the primary processing center or any other suitable location. Similarly, either bank personnel or system controllers may add, delete or change information stored in the off-line client list storage means 34 or the off-line due date storage means 34. Variations and substitutions in peripheral devices may be made without deviating from the spirit of the present invention. Information may be stored in a wide variety of storage mediums. Similarly, it will be apparent the unique names of storage means, such as the on-line due dates storage means 62 and the on-line client list storage means 60, do not limit the storage of information to different storage mediums. Instead, storage means may be combined or separated in a wide variety of formats as used by the processor.

What is claimed is:

1. A method of processing tax deposit information from a depositor, the method of processing comprising the steps of:
   (a) receiving tax deposit due dates information via a first remote terminal;
   (b) storing the tax deposit due dates information received in a processor on a first storage medium thereby defining a tax deposit due dates record;
   (c) receiving tax deposit information from a depositor via a second remote terminal;
   (d) producing a tax deposit record of the tax deposit information received;
   (e) providing the tax deposit information to a financial institution for enabling the financial institution to transfer money representing the tax deposit from a depositor's account maintained by the depositor to a bank tax account maintained by the financial institution;
   (f) comparing the tax deposit record against the tax deposit due dates record to determine if the tax deposit money held in the bank tax account must be transferred to a tax trust account;
   (g) if the tax deposit money held in the bank tax account must be transferred to the tax trust account, transferring money from the bank tax account to the tax trust account; and
   (h) generating reports of the tax deposit information for submission to a government.

2. The method of claim 1 further comprising the steps of:
   (a) receiving authorized depositor information via a terminal; and
   (b) storing the authorized depositor information received on a second storage medium thereby defining a depositors record.

3. The method of claim 2 further comprising the step of altering information from the depositors record.

4. The method of claim 2 or claim 3 further comprising the steps of:
   (a) comparing the tax deposit record against the depositors record to determine if the tax deposit was made by an authorized depositor; and
   (b) storing information in the tax deposit record indicating whether the tax deposit was made by an authorized depositor.

5. The method of claim 1 wherein the step of storing the tax deposit due dates information further comprises the step of altering information from the tax deposits due date record.

6. The method of claim 1 wherein the step of producing a tax deposit record of the tax deposit information received comprises:
   (a) storing the tax deposit record on a second storage medium; and
   (b) storing the tax deposit record on a third storage medium for use as a second record of the tax deposit information.

7. The method of claim 1 wherein the step of receiving tax deposit information from a depositor via a second remote terminal further comprises:
   (a) transferring prompting information from the processor to the depositor; and
   (b) transferring tax deposit information from the depositor to the processor.

8. The method of claim 7 further comprising the steps of:
   (a) storing the tax deposit information received from the depositor via the remote terminal on a second storage medium; and
   (b) storing the prompting information transferred by the processor to the depositor on a third storage medium.

9. The method of claim 1 wherein the step of providing the tax deposit information to a financial institution for enabling the financial institution to transfer money representing the tax deposit from a depositor's account maintained by the depositor to a bank tax account maintained by the financial institution further comprises:
   (a) storing the tax deposit record on a second storage medium; and
   (b) accessing the second stored record with the processor for use in transferring money representing the tax deposit from the depositor's account to the bank tax account.

10. The method of claim 1 wherein the step of generating reports of the tax deposit for submission to a government comprises:
    storing the tax deposit record on a second storage medium by the government.

11. The method of claim 1 wherein the step of generating reports of the tax deposit for submission to a government further comprises producing a "tax deposit coupon".

12. The method of claim 11 wherein the step of generating reports of the tax deposit for submission to a government further comprises producing a "tax deposit coupon" wherein the substep of producing a "tax deposit coupon" further comprises:
    (a) arranging the tax deposit information in the tax deposit record in a format defined by a government agency;
    (b) transmitting the tax deposit record to a recording means; and
    (c) recording the tax deposit record on a second storage medium for use by the government.

13. The method of claim 1 further comprising the step of generating reminders of future tax deposits.

14. The method of claim 13 wherein the step of generating reminders of future tax deposits comprises:
    (a) storing the tax deposit record on a second storage medium;
    (b) specifying a time period prior to a tax due date;
    (c) receiving further tax deposit information from a depositor via a third remote terminal;
    (d) storing the future tax deposit information received on a third storage medium thereby defining a future tax deposit record;
    (e) comparing the future tax deposit record against the tax deposit record to determine if the tax deposit is due within the specified time period;
    (f) comparing the future tax deposit record against the tax deposit record to determine if the processor has received tax deposit information corresponding to the future tax deposit record;
    (g) if the tax deposit is due within the specified time period and the processor has not received tax deposit information corresponding to the future tax deposit record, the step of generating a reminder comprising the steps of:
       (1) arranging the future tax deposit information in an order corresponding to a reminder;
       (2) transmitting the reminder to a recording means;
       (3) recording the reminder on a storage medium for use in communicating the reminder to the depositor; and
       (4) communicating the reminder to the depositor.

15. The method of claim 1 further comprising the steps of:
    (a) specifying a sequence of tax deposits which establish a tax deposit habit thereby defining a tax deposit habit;
    (b) determining if the tax deposit record establishes a tax deposit habit;
    (c) storing information on a second storage medium indicating whether the tax deposit record establishes a tax deposit habit, thereby defining a habit flag; and
    (d) recording information on the second storage medium indicating the identity of the depositor corresponding to the tax deposit record.

16. The method of claim 15 further comprising the steps of:
    (a) accessing the the second storage medium to determine if the depositor has established a tax deposit habit;
    (b) if the depositor has established a tax deposit habit, comparing the tax deposit record to the tax deposit habit to determine if the tax deposit record is consistent with the tax deposit habit; and
    (c) if the depositor has established a tax deposit habit and if the tax deposit record is not consistent with the tax deposit habit, transferring information to the depositor indicating that the tax deposit record is not consistent with the tax deposit habit.

* * * * *